(12) United States Patent
Hecker et al.

(10) Patent No.: US 10,766,473 B2
(45) Date of Patent: Sep. 8, 2020

(54) METHOD AND DEVICE FOR MONITORING THE CONDITION OF A SERVICE BRAKE, AS WELL AS BRAKE AND BRAKE SYSTEM

(71) Applicant: KNORR-BREMSE Systeme fuer Nutzfahrzeuge GmbH, Munich (DE)

(72) Inventors: Falk Hecker, Markgroeningen (DE); Robert Theil, Tuerkenfeld (DE); Alexander Werth, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 110 days.

(21) Appl. No.: 15/900,316

(22) Filed: Feb. 20, 2018

(65) Prior Publication Data
US 2018/0170340 A1    Jun. 21, 2018

Related U.S. Application Data

(63) Continuation of application No. PCT/EP2016/069327, filed on Aug. 15, 2016.

(30) Foreign Application Priority Data

Aug. 17, 2015    (DE) .................. 10 2015 113 587

(51) Int. Cl.
*B60T 17/22*        (2006.01)
*B60T 8/171*        (2006.01)
(Continued)

(52) U.S. Cl.
CPC ............ *B60T 17/221* (2013.01); *B60T 8/171* (2013.01); *B60T 8/172* (2013.01); *B60T 17/22* (2013.01);
(Continued)

(58) Field of Classification Search
CPC .............................. B60T 17/22; B60T 17/221
See application file for complete search history.

(56) References Cited

U.S. PATENT DOCUMENTS 6,411,206 B1    6/2002  Weant et al.
9,714,687 B2    7/2017  Linke et al.
(Continued)

FOREIGN PATENT DOCUMENTS

CN    102001330 A    4/2011
CN    103742575 A    4/2014
(Continued)

OTHER PUBLICATIONS

International Preliminary Report on Patentability (PCT/IB/326 & PCT/IB/373) issued in PCT Application No. PCT/EP2016/069327 dated Mar. 1, 2018, including English translation of document C2 (German-language Written Opinion (PCT/ISA/237)) previously filed Feb. 20, 2018 (eight (8) pages).
(Continued)

*Primary Examiner* — Thomas G Black
*Assistant Examiner* — Ana D Thomas
(74) *Attorney, Agent, or Firm* — Crowell & Moring LLP

(57) ABSTRACT

A method and apparatus for monitoring the condition of a service brake for a vehicle is provided. The service brake includes at least one linear path detection device for each service brake unit. The method includes reading a position signal of a service brake component from the path detection device over time or a time period, reading a pressure signal, a control signal and/or a lining wear signal, evaluating the position signal in order to determine at least one condition parameter of the service brake determined using the pressure signal, the control signal and/or the lining wear signal, and providing the condition parameter of the service brake to an interface for use in subsequent brake applications.

11 Claims, 6 Drawing Sheets

(51) Int. Cl.
  *F16D 66/02* (2006.01)
  *B60T 8/172* (2006.01)
  *F16D 66/00* (2006.01)
  *F16D 65/38* (2006.01)

(52) U.S. Cl.
  CPC ............ *F16D 65/38* (2013.01); *F16D 66/00* (2013.01); *F16D 66/026* (2013.01); *B60T 2270/406* (2013.01); *F16D 2065/386* (2013.01); *F16D 2066/001* (2013.01); *F16D 2066/003* (2013.01); *F16D 2066/005* (2013.01); *F16D 2066/006* (2013.01)

(56) References Cited

U.S. PATENT DOCUMENTS

| | | |
|---|---|---|
| 2009/0057073 A1 | 3/2009 | Ishii |
| 2011/0054758 A1 | 3/2011 | Bae et al. |
| 2015/0020520 A1 | 1/2015 | Feigel et al. |
| 2016/0123421 A1 | 5/2016 | Staahl et al. |
| 2018/0029583 A1* | 2/2018 | Dieckmann ........... F16D 66/026 |

FOREIGN PATENT DOCUMENTS

| | | |
|---|---|---|
| CN | 104169142 A | 11/2014 |
| DE | 33 00 446 A1 | 7/1984 |
| DE | 10 2006 002 307 A1 | 7/2007 |
| DE | 10 2011 009 199 A1 | 7/2012 |
| DE | 10 2013 012 104 A1 | 1/2015 |
| EP | 2 479 450 A1 | 7/2012 |
| JP | 2005-319913 A | 11/2005 |
| JP | 2009-73475 A | 4/2009 |
| WO | WO 2015/014450 A1 | 2/2015 |

OTHER PUBLICATIONS

International Search Report (PCT/ISA/210) issued in PCT Application No. PCT/EP2016/069327 dated Dec. 19, 2016 with English translation (five pages).

German-language Written Opinion (PCT/ISA/237) issued in PCT Application No. PCT/EP2016/069327 dated Dec. 19, 2016 (seven pages).

German-language Office Action issued in counterpart German Application No. 10 2015 113 587.6 dated Apr. 19, 2016 (11 pages).

Chinese-language Office Action issued in counterpart Chinese Application No. 201680052883.8 dated Dec. 29, 2018 with English translation (22 pages).

Chinese-language Office Action issued in counterpart Chinese Application No. 201680052883.8 dated Jul. 19, 2019 with English translation (10 pages).

Japanese-language Office Action issued in counterpart Japanese Application No. 2018-503767 dated Jun. 5, 2019 with English translation (eight (8) pages).

Hindi-language Office Action issued in Indian Application No. 201837004576 dated Jan. 30, 2020 with English translation (six (6) pages).

* cited by examiner

METHOD AND DEVICE FOR MONITORING THE CONDITION OF A SERVICE BRAKE, AS WELL AS BRAKE AND BRAKE SYSTEM

CROSS REFERENCE TO RELATED APPLICATIONS

This application is a continuation of PCT International Application No. PCT/EP2016/069327, filed Aug. 15, 2016, which claims priority under 35 U.S.C. § 119 from German Patent Application No. 10 2015 113 587.6, filed Aug. 17, 2015, the entire disclosures of which are herein expressly incorporated by reference.

BACKGROUND AND SUMMARY OF THE INVENTION

The invention relates to a method and to a device for monitoring the condition of a brake, to a method and to a device for operating a brake, and to a corresponding brake system as well as a brake and a brake system.

Pneumatically actuated disk brakes usually have wear on the brake linings, which wear can be sensed with a brake lining wear sensor of different designs. Owing to the design, it is possible that after a brake has been actuated, the brake linings of the disk are not reset enough, with the result that an excessively small clearance is set, if any.

DE 10 2006 002 307 A1 discloses a method for displaying the wear of at least one brake lining in a disk brake with an electromotive actuator.

DE 10 2013 012 104 A1 of the generic type describes a method for determining a brake clearance of a vehicle brake and vehicle brake having a device for determining a brake clearance. The vehicle brake has a brake application device, a wear adjustment device, a sensor apparatus for detecting an activation stroke of the brake application device and a vehicle control system. The corresponding method comprises the method steps of picking up a measurement signal of the actuation stroke which is made available by the sensor apparatus, within a previously definable time window during a braking process and storing the measurement signal as data pairs of the actuation stroke/time during a braking process; forming a derivative of the measurement signal over time in the time window with a suitable algorithm for determining a time in the case of a maximum; and determining the brake clearance on the basis of the time determined in this way, and passing on the value of the brake clearance which has been determined in this way to the vehicle control system. A vehicle brake is equipped with a device for determining a brake clearance in order to carry out the method.

Owing to the ever increasing demands to reduce costs, which not only involve a requirement not only to maintain but also increase the quality and benefit simultaneously and also to reduce maintenance costs, there is a corresponding demand for an improved method for determining a brake clearance and the brake lining wear of a vehicle brake. The brake clearance can be changed over time by different interference influences.

Therefore, the object of the present invention is to make available an improved method for monitoring the condition such as, for example, a brake clearance, of a vehicle brake. Also to make available a method for operating the vehicle brake and corresponding devices for carrying out the methods. A further object is to provide an improved vehicle brake.

This object is achieved by means of the features of the independent claims.

Said features make it possible, individually and in combination, to prolong further the service life of a vehicle brake and to harmonize further the wear of a plurality of vehicle brakes, in order to be able to utilize service intervals in an optimum way.

A method for monitoring the condition of a service brake for a vehicle, in particular for a utility vehicle, having at least one, in particular linear, path detection apparatus for each service brake, has the following steps:

a) reading a position signal, wherein the position signal represents a position of a component of the service brake which is detected by the linear path detection apparatus, in particular represents a position over time or a time profile, wherein, in addition, in the reading step a pressure signal is read, and additionally or alternatively a control signal is read, and additionally or alternatively a brake lining wear signal is read, b) evaluating the position signal in order to determine at least one condition parameter of the service brake, wherein in the evaluation step the state parameter is determined using the pressure signal, and additionally or alternatively the control signal, and additionally or alternatively the lining wear signal; and c) making available the condition parameter of the service brake at an interface.

In the evaluation step, in this case the condition parameter is determined differently than in the generic prior art, additionally using the pressure signal and additionally or alternatively the control signal and additionally or alternatively the brake lining wear signal. In this way the evaluation can be improved.

A vehicle can be understood to be a utility vehicle or a trailer or semitrailer for a utility vehicle. A utility vehicle can also be referred to as a commercial vehicle or motor vehicle which is intended, in terms of its design and equipment, for the transportation of persons or goods or for towing trailers, such as, for example, a bus, truck, articulated truck, tractive unit or crane truck. A path detection apparatus can be understood to be a sensor. The path detection apparatus can be embodied as a linear path detection apparatus. In this context, different measuring methods such as optical, mechanical, electrical or magneto-electrical measuring methods can be used. The position signal can be understood to be an electrical signal, either an analog or a digital signal. The position signal can represent a relative position of two components of the brake.

In the reading step, a pressure signal and additionally or alternatively a control signal and additionally or alternatively a brake lining wear signal are read. In the evaluation step, in this case the condition parameter can be determined using the pressure signal, and additionally or alternatively the control signal, and additionally or alternatively the brake lining wear signal. In this way the evaluation can be improved.

It is advantageous if, in the making available step, a controlled variable is made available instead of the condition parameter or in addition to the condition parameter. The controlled variable can be determined using the condition parameter. The controlled variable can be made available as a control signal. The condition parameter can represent a brake clearance, a brake lining wear value or a fault or a type of fault of the brake. In this context, the condition parameter can also be understood to be a multiplicity of parameters or condition information items. A condition of the brake can be advantageously diagnosed in this way.

The controlled variable can represent here a control signal for a response pressure and additionally or alternatively an application pressure for a friction apparatus of the service brake. It is therefore possible for a condition of the brake to be changed, in particular in a closed control loop, using the condition parameter and the controlled variable which is derived therefrom.

In one embodiment, the controlled variable can represent a signal for actuating an actuator of the service brake. In this context, the actuator can be a bidirectional adjustment device, in particular an electrical adjustment device, and additionally or alternatively a brake cylinder and additionally or alternatively an additional component of the brake cylinder of the service brake. An actuator can be understood to be an actuator element or an actuator device. A condition of the service brake can thus advantageously be changed actively. For example, an excessively large brake clearance can be reduced, or an excessively small brake clearance can be enlarged. It is therefore possible both to shorten the braking distance (compared to an excessively large brake clearance) and to detect and prevent hot running of the brake (compared to a brake clearance which is too small or the absence of a brake clearance).

In the evaluation step, the condition parameter can represent information about a brake lining wear value and additionally or alternatively a brake lining growth value and additionally or alternatively a brake clearance and additionally or alternatively a readiness to brake, and additionally or alternatively fault information of the service brake. It is therefore possible to make available information about the condition of the service brake to a driver or to a control unit. Alternatively, a device within the service brake can process the information and in this way optimize the condition of the service brake and for the sake of a longer service life and improved readiness to brake.

It can be advantageous to check the plausibility of the brake lining wear signal using the position signal in the reading step. It is therefore possible to make available more robust information about the brake lining wear.

A method for operating a brake system of a vehicle, in particular of a utility vehicle, comprises the following steps, wherein the brake system comprises at least one service brake and a device for monitoring the condition of the service brake:
a) reading a condition parameter, determined according to a method as described above, of the service brake from an interface of the device for monitoring the condition of the service brake;
b) evaluating the condition parameter in order to determine a brake actuation signal using the evaluated condition parameter and a brake request signal, in order to set readiness for braking and additionally or alternatively a desired condition of the service brake; and
c) making available the brake actuation signal of the service brake at an interface in order to actuate the service brake.

It is therefore possible to address or actuate the brakes of a brake system in accordance with the condition information or the condition parameter of the corresponding brake.

Before the reading step, at least one boundary parameter can be checked. The further steps of the method can be carried out in one embodiment only if the at least one boundary parameter is within a predefined target range.

In the evaluation step, the brake actuation signal can be determined in such a way that a multiplicity of actuated service brakes of the vehicle have harmonized wear.

It is therefore clear, from reading the information, how large the differential pressure between the actuation and release of the brake is. As a result, in contrast with a conventional control system (without detection of the condition parameters of a brake) the request pressure during the reduction of the braking request can be reduced by the currently determined absolute value. The reaction in the actuation can subsequently be checked and adjusted directly using the sensor. On the basis of the determined and stored pressure/travel profiles it is possible to supply the brake system at any time with the pressure values which are actually required for applying or releasing the brakes.

In a brake which is provided with sensors according to this invention, the response of the mechanical components can be detected from the change in the measured signals. As a result, it is possible for the brake control system to know the response pressure of each individual brake and to adapt the pressure request to the effect that at which pressure the components of the brake are set in motion. As a result, the actuation of the brakes can be controlled without the pole wheel measurements having to be used. This reduces the air consumption and improves the response time in the case of ABS/EBS control.

A further application case is the preparation of a brake before actuation of the brake. In this context, the pressure is applied at each brake until a certain position of the brake mechanism is reached. For example, up to the application of the brake linings (without delay) or up to a minimum brake clearance or e.g. brake clearance of 0.4 mm. The respective position is detected by the sensor system, and the brake system can detect the increase in pressure on the basis of the imminent distance from the actuation apparatus.

It is therefore possible for all the brakes of a vehicle to be placed in a state of readiness to brake and simultaneously trigger independently of their condition of the individual brake (e.g. different brake clearance or different brake lining wear at different wheels). And therefore to achieve better deceleration of the entire vehicle.

Readiness to brake can also be requested by driver assistance systems, such as for example distance radar, traffic information systems, Car2Car communication, traffic control systems. In this context, it is possible to operate the brakes with parameters which have high process reliability, since the information from the linear sensor is available. It is therefore possible to set the brake clearance situationally to the reliable minimum. And where necessary reduced and also increased if suitable actuators are used.

Furthermore, it is also possible to set a dynamic lead of the brake signal as a function of various condition parameters of the brakes in the vehicle, in order to react to different line lengths or different brake clearance values, wear conditions and brake rigidity values.

A further advantageous application is obtained if, for example in the case of trailer vehicles, only one pressure modulator is available for a plurality of brakes.

Here it is customary to set in the pressure modulator a fixed pressure at which the brakes can be triggered. As a result, the various axles can be actuated with a delay. However, if the condition parameters—detected by sensors—are present in the brake, the triggering times can be varied together with actuators in such a way that e.g. the different wear of different wheels can be taken into account and compensated within the scope of stable driving parameters by virtue of the lead being dynamically adapted by changing the brake clearance.

From the changes in the condition parameters of the brake over the use, fault states such as excessively high reductions in efficacy in the actuation (hysteresis) can be detected.

As a result, it is advantageously possible to infer the failure of components. For example, plastic deformation of the rotary lever gives rise to a difficulty of movement of the actuation system which can be read by sensors by changing the characteristic line (see figures). Likewise, a failure of bearing points of the mechanism on the lever mount, bridge support, etc. can be detected. Likewise, a malfunction in the guiding of the brake lining or guiding for the caliper can be detected.

It is possible to determine the rigidity of the brake using the profile of the determined sensor line after the application of the brake linings.

The rigidity of the system arises from the rigidity of the brake application unit and the rigidity of the brake linings. The rigidity of the brake linings changes as a function of the residual brake lining thickness. It is also possible to react here to the dynamic change in the condition values of the brake over the operating time, with the result that there can be a more rapid control and at the same time less air is consumed for said control.

A mechanical failure of the brake application unit, e.g. a fracture in the brake caliper can be detected through a drastically changed profile of the pressure/travel dependence.

Such fault states can give rise to jamming and malfunctions of the brake or can lead to an insufficient braking effect.

Fault states can be displayed in the driver's cab in the on-board tools, stored in the control unit and read out during servicing or displayed on a smartphone by telecommunication apparatus or transmitted to haulage companies or fleet management devices.

In a most favorable case, the operation of a faulty brake of the brake system can be reduced and avoided if the current driving state permits it. For example, in the event of adaptive braking in the low pressure range it is possible to dispense with actuation of a jamming brake. In the case of emergency braking operations the fault state is bypassed, and a full braking request is applied to all the brakes.

In the case of a brake system with brakes which are equipped in this way, sensors and methods for the evaluation thereof it is possible to calculate a/the current damage of the brake from a number of actuations, the brake pressures and the actuation stroke and/or to determine the expected service life of the brake or expected values for the future service life of the brake.

The device for monitoring the condition of a service brake of a vehicle, in particular of a utility vehicle, has apparatuses which are designed to carry out, and additionally or alternatively implement, the steps of a method for monitoring the condition of a brake:
a) an interface for reading a position signal, wherein the position signal represents a position of a component of the service brake which has been detected by the linear path detection apparatus;
b) an apparatus for evaluating the position signal, in order to determine at least one condition parameter of the service brake;
c) an apparatus for making available the condition parameter of the service brake at an interface.

A device for operating a brake system of a vehicle, in particular a utility vehicle, has the following apparatuses, wherein the brake system comprises at least one service brake and a device as above for monitoring the condition of the service brake:
a) an interface for reading a state parameter of the service brake from an interface of the device for monitoring the condition of the service brake;
b) an apparatus for evaluating the condition parameter in order to determine a brake actuation signal using the evaluated condition parameter and a brake request signal, in order to set the readiness to brake and additionally or alternatively a desired condition of the service brake; and
c) an interface for making available the brake actuation signal in order to actuate the service brake.

A path detection apparatus for a service brake of a vehicle, in particular a linear path detection apparatus, is designed to make available a position signal, wherein the position signal represents a position, detected by the, in particular linear, path detection apparatus, of a component of the service brake. In particular, the position signal represents a position over time or a time profile. In this context, a moving component of the service brake can be provided with optical markings which are scanned by a laser or an LED and whose reflection is evaluated by a corresponding photodiode. Alternatively, the path detection apparatus can operate, for example, according to the Doppler principle. A variant of the path detection apparatus can detect a change in resistance or a change in impedance. It is therefore possible to implement the path detection apparatus cost-effectively.

The brake for a vehicle, in particular for a utility vehicle, comprises a device as described above for monitoring the condition of the brake and additionally or alternatively a corresponding variant of a path detection apparatus as described above.

The brake system for a vehicle, in particular a utility vehicle, comprises a first brake arranged on an axle, at least a second brake which is arranged on the axle on a side of the axle lying opposite the first brake with respect to a vehicle longitudinal axis, or on a further axle, as well as a device for operating the brake system as described above, wherein the operating device is designed to actuate the first brake and the at least second brake.

A corresponding vehicle comprises the brake systems described above. The brakes of the vehicle are advantageously worn uniformly and the vehicle has a shorter braking distance compared to a vehicle without the brake system according to the invention, which improves road safety.

The devices described above generally can be understood to include a control unit. A control unit can be designed to carry out, execute or implement the steps of a variant of a method proposed here in corresponding apparatuses. A control unit can be understood to be an electrical unit or electrical circuit, for example an integrated circuit. A control unit can also be understood to be a closed-loop control apparatus, and an ECU or an open-loop control apparatus. The control unit can be part of an electronic brake system. The control unit can be designed to receive and output signals via suitable interfaces. The control unit can also implement efficiently the concept on which the invention is based.

A control unit can be understood here to be an electrical unit which processes sensor signals and outputs control signals and/or data signals as a function of the sensor signals. The interfaces of the control apparatus can be embodied by means of hardware and/or software. In a hardware implementation, the interfaces can be, for example, part of what is referred to as a system ASIC which includes a wide variety of functions of the open-loop control apparatus. The interfaces can, however, also be embodied as separate, integrated circuits, or be composed at least partially of discrete components. In the case of a software implementation, the interfaces can be software modules which are present, for example, on a microcontroller in addition to other software modules.

A computer program product with program code which can be stored on a machine-readable carrier such as a semiconductor memory and used to execute the method according to one of the embodiments described above when the computer program product is executed on a control apparatus or a control unit is also advantageous.

Moreover, the method according to the invention can be updated by an update of a software for an electronic brake system (EBS) in such a way that new fault states such as are determined in in-the-field operation or in in-the-field testing can be stored. It is therefore possible to optimize the operating state of the brakes further.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will be described in more detail below on the basis of exemplary embodiments and with reference to the figures, in which.

DETAILED DESCRIPTION OF THE DRAWINGS

Figure 1:
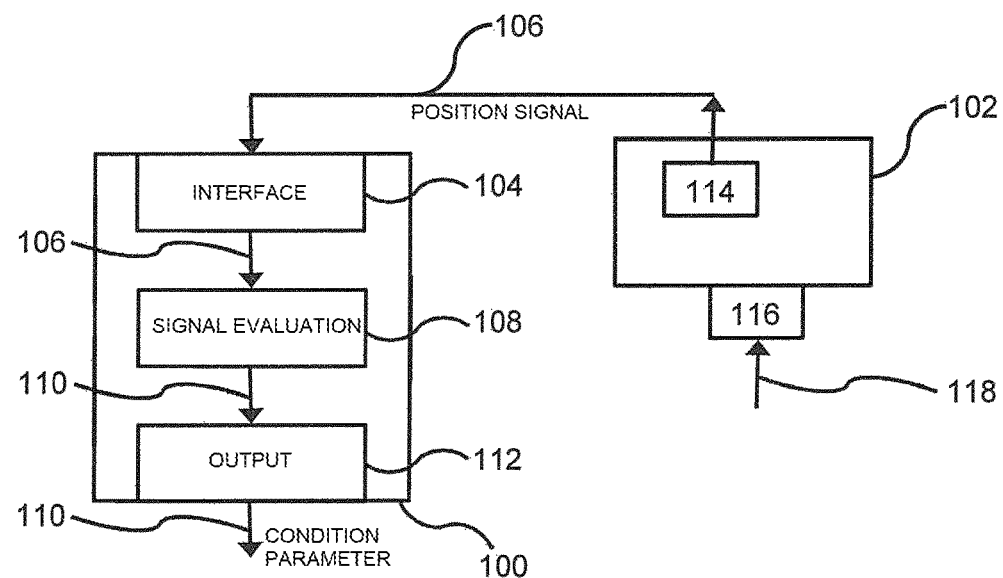
FIG. 1 shows a schematic block illustration of an embodiment of a device according to the invention for monitoring the condition of a brake.

FIG. 1 shows a schematic block illustration of an embodiment of a device 100 according to the invention for monitoring the condition of a brake 102. The device 100 comprises an interface 104 for reading a position signal 106, an apparatus 108 for evaluating the position signal 106, in order to determine at least one condition parameter 110 of the brake 102, and an apparatus 112 for making available the condition parameter 110 of the brake 102. The position signal 106 represents here a position, detected by the linear path detection apparatus 114, of a component of the brake 102.

The brake 102 has a position detection apparatus 114. In the embodiment shown, this is a linear path detection apparatus 114. The path detection apparatus 114 is a linear sensor 114 which detects a relative change in position by an optical or electrical measurement method and makes it available as a sensor signal 106 which represents the change in position. The positioning of the path detection apparatus 114 is explained in more detail in FIG. 3.

The brake 102 also has a brake cylinder 116 which is actuated by a pressure signal 118. Therefore, one embodiment involves a pneumatic disk brake 102 with a correspondingly pneumatically actuated brake cylinder 116.

In one embodiment which is not shown in FIG. 1, the position detection apparatus 114 is a rotation sensor 114 which makes available, by known geometric relationships, a sensor signal 106 which represents linear path information.

Figure 2:
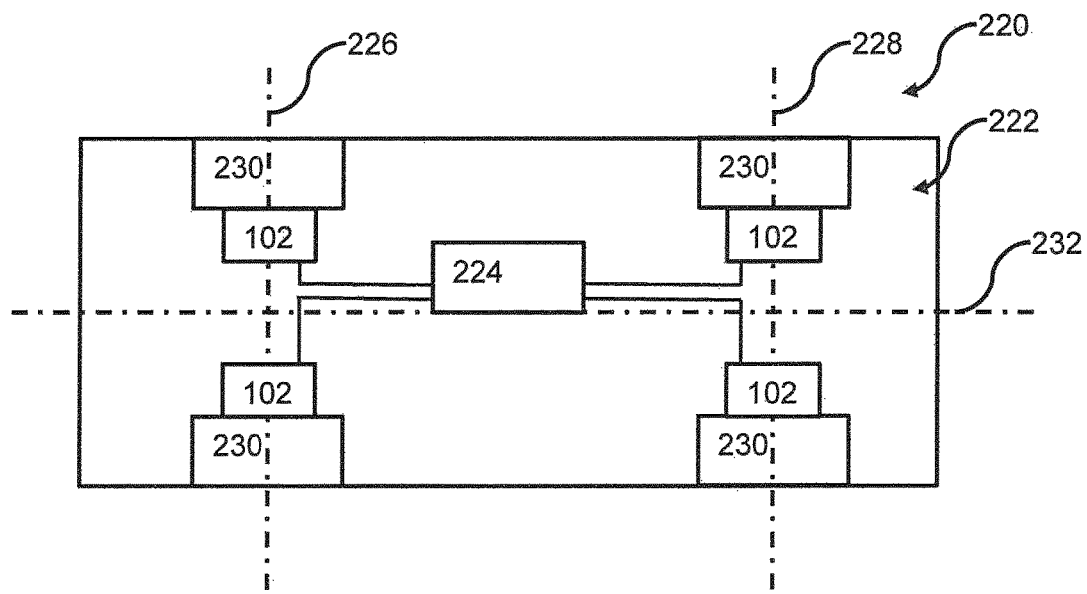
FIG. 2 shows a schematic illustration of a vehicle having a brake system and a device for operating the latter according to an embodiment of the present invention.

FIG. 2 shows a schematic illustration of a vehicle 220 with a brake system 222 and a device 224 for operating this brake system 222 according to an exemplary embodiment of the present invention. The vehicle 220 has two axles 226, 228, on each of which a wheel 230 having a service brake 102 is respectively arranged on the opposite side of the vehicle. In one embodiment, the vehicle 220 is a utility vehicle 220.

The service brake 102 can be an embodiment of a brake 102 which is shown in FIG. 1. The device 224 is connected to the brakes 102 via control lines and sensor lines. The control lines can be a pneumatic actuation means and corresponding pressure lines. Likewise, the control lines can also be understood to be electrical lines over which corresponding control signals are conducted.

The figure illustrates a vehicle longitudinal axis 232 with respect to which the wheels or service brakes 102 are arranged essentially symmetrically. The illustrated brake system 222 comprises at least a first service brake 102 on a first axle 226 and a second service brake 102 on the side on the first axle 226 which lies opposite the vehicle longitudinal axis 232, or alternatively on a second axle 228. In the illustrated embodiment, the brake system 222 comprises four brakes 102, wherein two of the brakes 102 are always arranged in each case on one of the axles 226, 228 on sides lying opposite the vehicle longitudinal axis. Furthermore, the brake system 222 comprises the device 224 and the control and sensor lines between the device 224 and the brakes 102. Further components such as brake cylinders, ABS, EBS, compressor, air conditioning means etc. which can generally also be assigned to the brake system are not illustrated.

Figure 3:
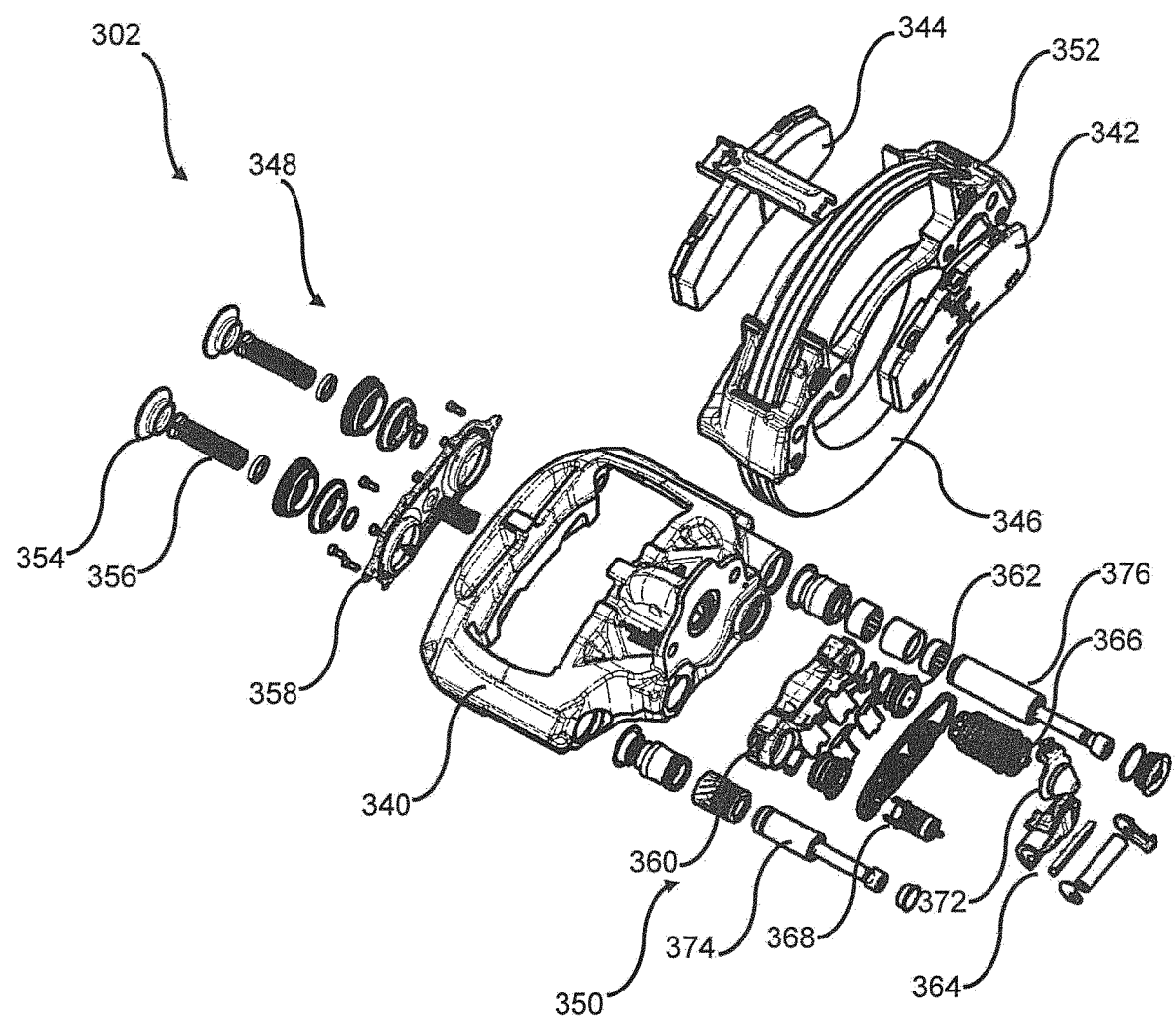
FIG. 3 shows an exploded illustration of a disk brake according to an embodiment of the present invention.

FIG. 3 shows an exploded illustration of a disk brake 302 according to an embodiment of the present invention. The disk brake 302 can be a particular embodiment of a brake 102 or service brake 102 of a vehicle shown in FIG. 1 or FIG. 2. Pneumatically actuated disk brakes 302 usually have a brake caliper 340 which is embodied as a sliding caliper 340, pivoting caliper or fixed caliper and in which a brake application device is arranged, said brake application device serving to apply operatively brake linings 342, 344 on both sides of a brake disk 346, and the brake disk 346, to one another, in order to bring about the braking effect through friction. In the illustrated embodiment, this involves a pneumatically actuated disk brake 302 with a sliding caliper 340.

Depending on the embodiment, the brake application apparatus can be activated pneumatically or electromotively. The reaction-side brake lining 342 is pressed against the vehicle-side brake disk 346 when actuation occurs. During the further course of the braking process, the brake caliper 340 is moved with respect to the brake disk 346, counter to the brake application direction of the reaction-side brake lining 342, entraining and pressing the reaction-side brake lining 344 lying opposite against the other side of the brake disk 346.

After the brake 102 has been released, in the case of the known disk brake the brake caliper 340 remains in this position in which the brake linings 342, 344, and at least the reaction-side brake lining 344, are pressureless but bear against the brake disk 346 in a grinding fashion. The residual grinding moments of the brake linings which occur as a result during the driving operation can have a disadvantageous effect insofar as they can give rise to increased fuel consumption as well as to a reduction in the service life of the components involved, specifically the brake disk and the brake linings.

Pneumatically actuated disk brakes 302 have become part of the standard equipment in heavy utility vehicles. Such disk brakes 302 require a mechanical transmission in order to generate the required brake application force since the force of the brake cylinders which are acted upon pneumatically is limited owing to the pressure level (currently approximately 10 bar) and the limited installation size of the brake cylinders. In currently known pneumatically actuated disk brakes 302 transmission ratios between 10:1 and 20:1 are found.

The disk brake 302 illustrated in FIG. 3 comprises, as is already described, a brake application apparatus 348, a guide apparatus 350 and a lining holding apparatus 352. In this context, the brake application apparatus 348 comprises two pressure elements 354 which are arranged in parallel, transmission pipes 356 which are assigned thereto, a floor plate 358, the brake caliper 340 as well as also a bridge 360, gearwheels 362 and a lever 364 which is operatively connected to the bridge 360, in particular via eccentric bearings. Furthermore, the brake application apparatus 348 comprises an adjustment device 366 as well as a sensor apparatus 372 which is arranged in parallel with the latter and connected thereto via a coupling element 368 and a synchronization chain 370.

The guide apparatus 350 comprises a floating bearing strut 374 which is assigned to a floating bearing as well as, arranged parallel thereto, a fixed bearing strut 376 which is assigned to a fixed bearing. The lining holding apparatus 352 comprises essentially a lining carrier 352.

A relative determination of position is carried out with a path detection apparatus 114 which is not illustrated in FIG. 3 and is described in FIG. 1. The latter detects a change in position within the brake application apparatus 348 between floor plate 358, brake caliper 340 or sensor apparatus 372, on the one hand, and bridge 360, coupling element 368 or lever 364, on the other. Alternatively, the linear movement can also be detected with a rotational sensor on the rotational axis of the lever 364 or with a linear sensor at a corresponding position as a deflection of the lever 364.

Figure 4:
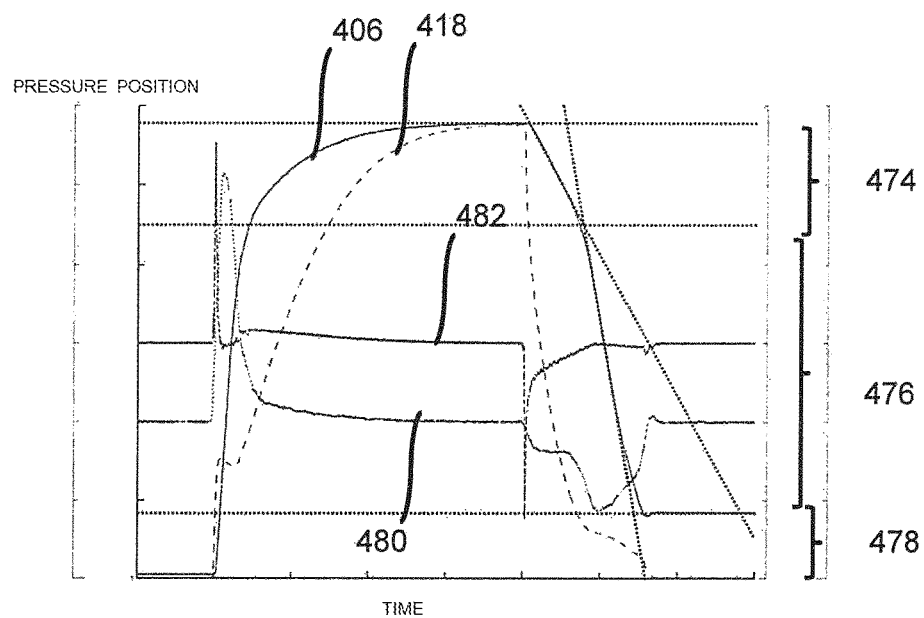
FIGS. 4-7 show graphic illustrations of position signals and pressure signals of different brake configurations according to embodiments of the present invention.
Figure 5:
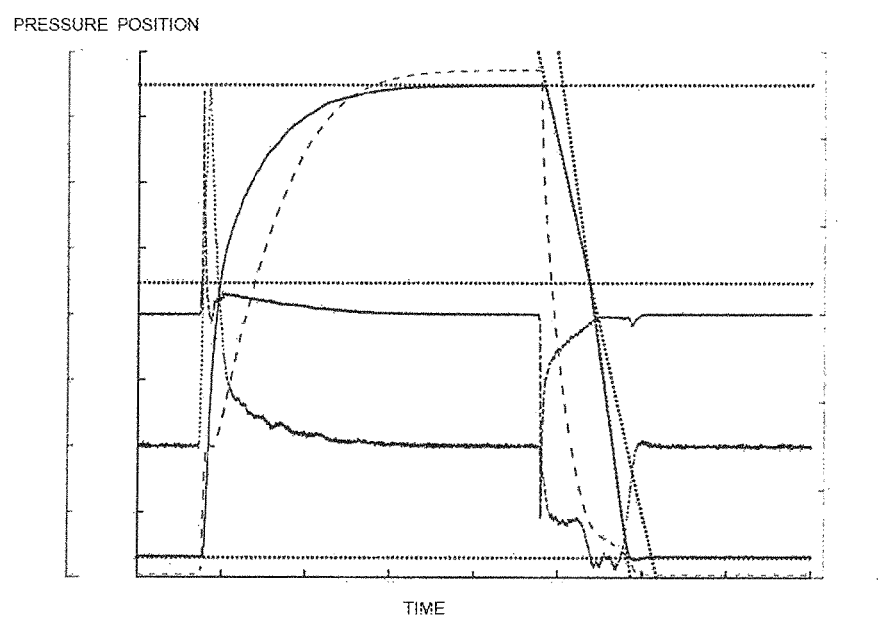

FIGS. 4-7 show graphic illustrations of position signals and pressure signals of different brake configurations according to embodiments of the present invention. The position signal 406 can be the position signal 106 shown in FIG. 1. The pressure signal 418 can be the pneumatic actuation signal of the brake cylinder 116 shown in FIG. 1. The position signal 406 firstly shows, after the release of the brake at two applied tangents, an elasticity stroke 474 and then, at the second tangent, the brake clearance stroke 476. The difference between the signal level before the braking operation and after the braking operation signals the adjustment distance 478 by which the brake clearance has been reduced or enlarged. FIG. 4 and FIG. 5 show the signal profile over time, wherein the signal profiles 406, 418 are illustrated over time, and the signal profile 480 illustrates the gradient with respect to the position signal, and the signal profile 482 illustrates the gradient of the pressure signal 418. FIG. 4 shows signals in the case of excessively large brake clearance, and FIG. 5 shows the signal profile during a braking operation with a correctly set brake clearance.

Figure 6:
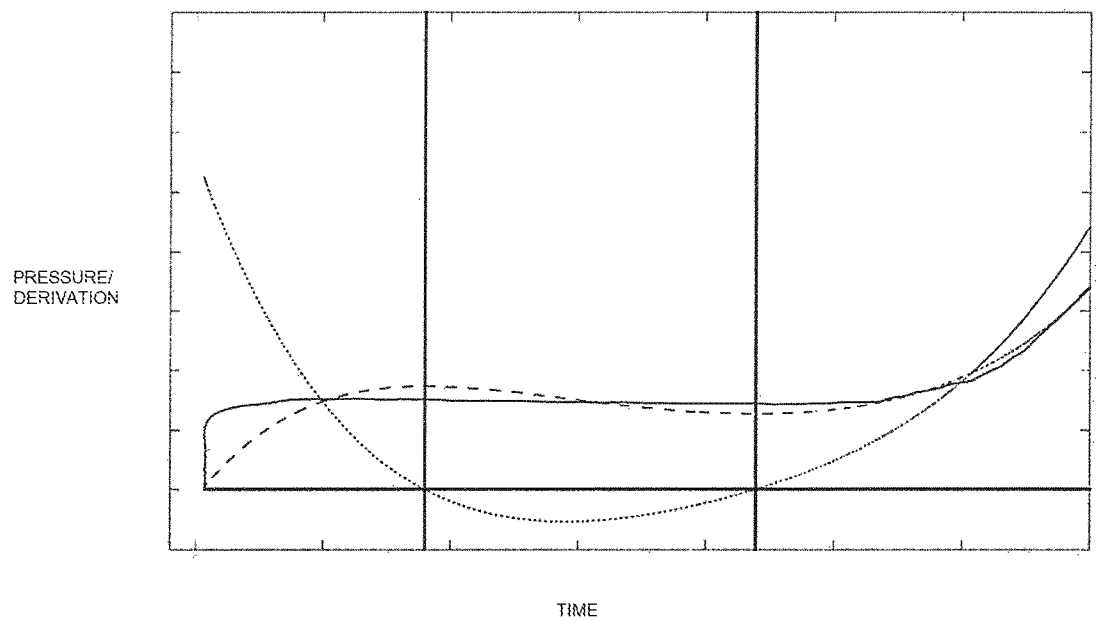
Figure 7:
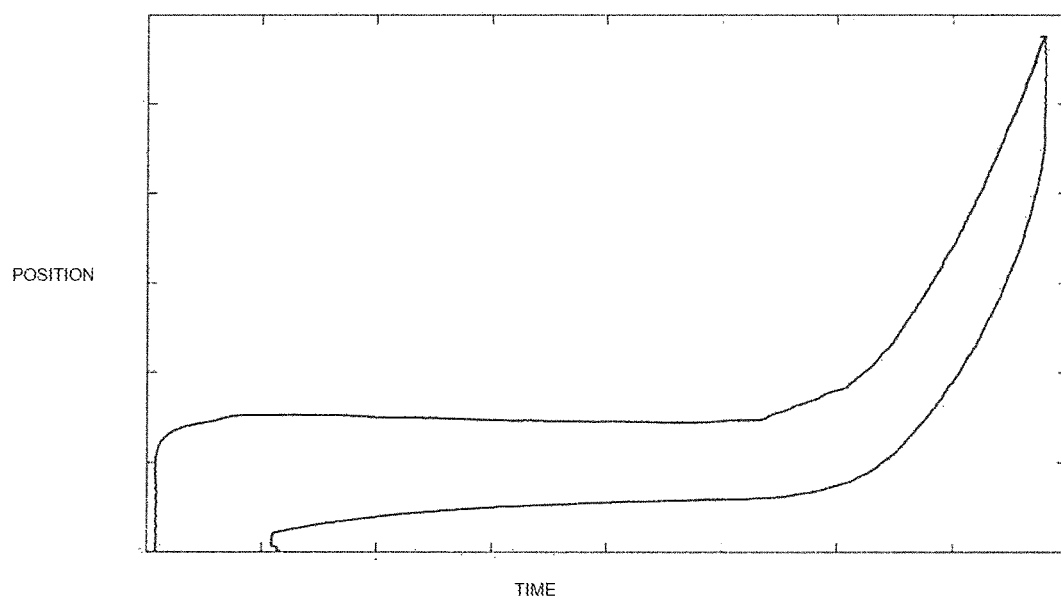

FIG. 6 and FIG. 7 show the pressure profile over the path as what is referred to as hysteresis. In this context, the elasticity of the brake becomes clear in the gradient of the curve. The dashed line shows a fitted curve with respect to the measured curve, and the dotted curve shows a derivation of the fitted curve. The fitting of the curve is also referred to as "curve fitting". The second zero point of the derivation and therefore the inflection point of the fitted curve indicates the brake clearance. The actuation of the brake is shown in FIG. 6, and FIG. 7 shows an entire braking process with the actuation and release of the brake.

Figure 8:
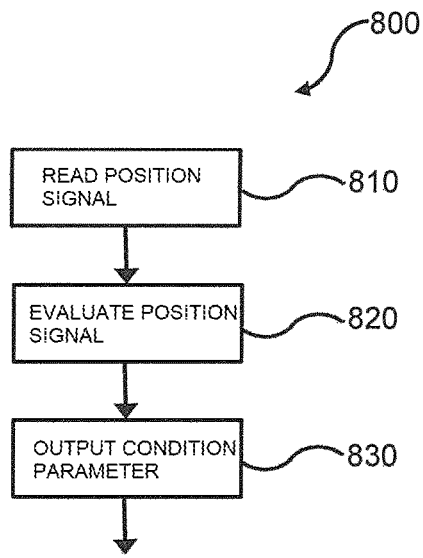
FIG. 8 shows a flowchart of a method for monitoring the condition of a brake according to an embodiment of the present invention.

FIG. 8 shows a flowchart of a method 800 for monitoring the condition of a brake according to an exemplary embodiment of the present invention. The method 800 for monitoring the condition of a service brake for a vehicle comprises a step 810 of reading a position signal, wherein the position signal represents a position, detected by the linear path detection apparatus, of a component of the service brake, in particular represents a position over time or a time profile, a step 820 of the evaluation of the position signal, in order to determine at least one condition parameter of the service brake, as well as a step 830 of making available the condition parameter of the service brake at an interface.

Figure 9:
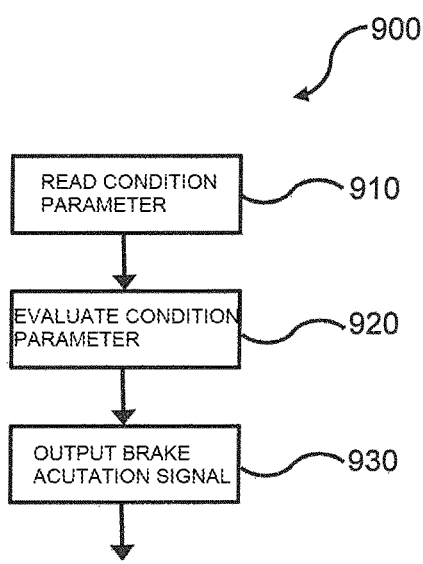
FIG. 9 shows a flowchart of a method for operating a brake according to an embodiment of the present invention.

FIG. 9 shows a flowchart of a method 900 for operating a brake according to an exemplary embodiment of the present invention. The method 900 for operating a brake system of a vehicle, in particular a utility vehicle, wherein the brake system comprises at least one service brake and a device for monitoring the condition of the service brake, comprises a step 910 of reading a condition parameter of the service brake from an interface of the device for monitoring the condition of the service brake, a step 920 of evaluating the condition parameter in order to determine a brake actuation signal using the evaluated condition parameter and a brake request signal, in order to set a readiness to brake and/or a desired condition of the service brake, as well as a step 930 of making available the brake actuation signal of the service brake at an interface, in order to actuate the service brake.

Figure 10:
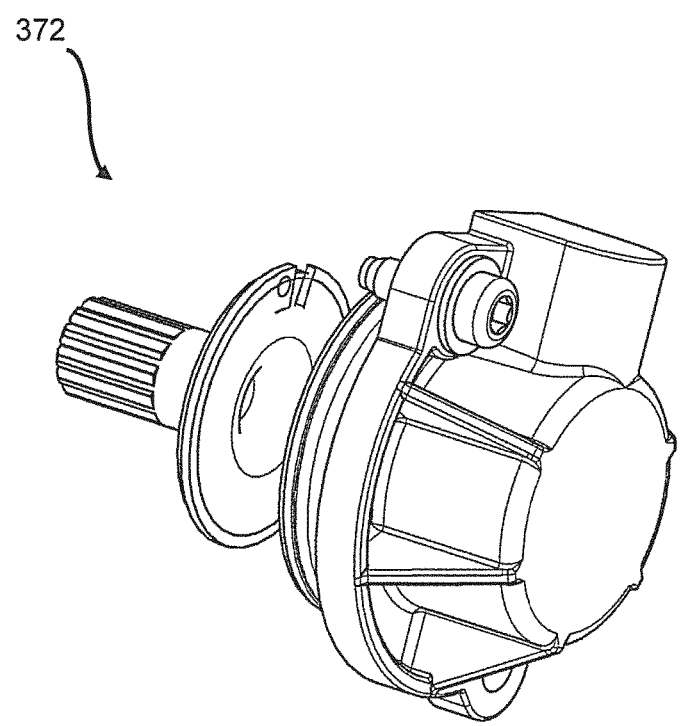
FIG. 10 shows a three-dimensional illustration of a rotational position sensor according to an embodiment of the present invention.

FIG. 10 shows a three-dimensional illustration of a rotational position sensor as a sensor apparatus 372 according to an exemplary embodiment of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

100 Device
102 Brake, service brake
104 Reading interface
106 Position signal
108 Evaluation apparatus
110 Condition parameter
112 Making available apparatus
114 Path detection apparatus
116 Brake cylinder
118 Pressure signal
220 Vehicle
222 Brake system
224 Operating device
226, 228 Axle/axles
230 Wheel
232 Vehicle longitudinal axis
302 Disk brake
340 Brake caliper
342 Inner brake lining, action-side brake lining
344 Outer brake lining, reaction-side brake lining 346 Brake disk
348 Brake application apparatus
350 Guide apparatus
352 Brake lining holding apparatus, carrier
354 Pressure element
356 Transmission pipe
358 Floor plate
360 Bridge
362 Gearwheel
364 Lever
366 Adjustment device
368 Coupling element
370 Synchronization chain
372 Sensor apparatus (position detection apparatus, potentiometer)
406 Position signal
418 Pressure signal
474 Elasticity stroke
476 Brake clearance stroke, brake clearance
478 Adjustment distance
480 Gradient of the position signal 406
482 Gradient of the pressure signal 418
800 Method
810 Reading step
820 Evaluation step
830 Making available step
900 Method
910 Reading step
920 Evaluation step
930 Making available step

What is claimed is:

1. A method for monitoring a condition of a service brake for a vehicle having at least one linear path detection apparatus, comprising the acts of:
reading a position signal using the at least one linear path detection apparatus, the position signal representing a position of a component of the service brake detected by the linear path detection apparatus over time or a time profile;
reading at least one of a pressure signal, a control signal and a brake lining wear signal during the act of reading the position signal;
determining by evaluation by a controller at least one condition parameter of the service brake based on at least one of the read pressure signal, the control signal, and the brake lining wear signal; and
altering a subsequent service brake application based on the at least one of the at least one condition parameter and a controlled variable determined based on the at least one condition parameter,
wherein
the act of altering a subsequent service brake application based on the presented at least one condition parameter includes:
determining a brake actuation signal based on a brake request signal and the at least one of the at least one condition parameter and the controlled variable, the brake actuation signal corresponding to a predetermined desired readiness for braking condition of the service brake, and
placing the service brake into the predetermined desired readiness for braking condition,
the service brake includes a plurality of service brake units at a plurality of vehicle wheels, and
the placing of the service brake into the predetermined desired readiness for braking condition includes adjusting the actuators of the plurality of service brake units to decrease brake pad wear differences between the plurality of service brake units.

2. The method as claimed in claim 1, wherein
the controlled variable represents a control signal for at least one of a response pressure and an application pressure for a friction apparatus of the service brake.

3. The method as claimed in claim 2, wherein
an actuator of the service brake is at least one of an electric bidirectional adjustment device, a brake cylinder and an additional component of the brake cylinder of the service brake, and
the controlled variable represents a signal for actuating the actuator.

4. The method as claimed in claim 1, wherein
in the act of determining the at least one condition parameter, the at least one condition parameter represents at least one of a brake lining wear value, a brake lining growth value, a brake clearance value, a readiness to brake, and fault information of the service brake.

5. The method as claimed in claim 1, wherein
the act of reading at least one of the pressure signal, the control signal and the brake lining wear signal includes determining using the position signal a plausibility of the brake lining wear signal.

6. The method as claimed in claim 1, further comprising the acts of
before the reading acts, determining at least one boundary parameter; and
determining whether the at least one boundary parameter is within a predefined target range,
wherein the method proceeds with the reading acts only if the at least one boundary parameter is within a predefined target range.

7. A service brake condition monitoring device of a vehicle, comprising:
a service brake for a vehicle having at least one linear path detection apparatus;
an interface configured to read a position signal from the at least one linear path detection apparatus, the position signal representing a position of a component of the service brake detectable by the at least one linear path detection apparatus; and
a controller configured to evaluate the position signal read by the interface, determine at least one condition parameter of the service brake, and alter a subsequent service brake application based on the at least one condition parameter,
wherein
at least one condition parameter includes a brake actuation signal based on a brake request signal and the at least one of the at least one condition parameter and the controlled variable, the brake actuation signal corresponding to a predetermined desired readiness for braking condition of the service brake,
the service brake includes a plurality of service brake units at a plurality of vehicle wheels,
the altering of a subsequent service brake application includes
placing the service brake into the predetermined desired readiness for braking condition by adjusting the actuators of the plurality of service brake units to decrease brake pad wear differences between the plurality of service brake units.

8. The service brake condition monitoring device of claim 7, wherein:
the controller is further configured to determine a brake actuation signal based on a brake request signal and the at least one condition parameter, the brake actuation signal corresponding to a predetermined desired readiness for braking condition of the service brake, and place the service brake into the predetermined desired readiness for braking condition.

9. A brake for a vehicle, comprising:
a service brake having a linear path detection apparatus configured to generate a position signal corresponding to a position of a component of the service brake over time or a time profile.

10. A brake system for a vehicle, comprising:
a first service brake having a first linear path detection apparatus configured to generate a position signal corresponding to a position of a component of the first service brake over time or a time profile arranged on an axle;
at least a second service brake having a second linear path detection apparatus configured to generate a position signal corresponding to a position of a component of the second service brake over time or a time profile arranged on the axle on a side of the axle opposite the first service brake or on a further axle;
an interface configured to read position signals from each linear path detection apparatus; and
a controller configured to evaluate the position signals read by the interface, determine at least one condition parameter of each service brake, and alter a subsequent at least one condition parameter includes a brake actuation signal based on a brake request signal and the at least one of the at least one condition parameter and the controlled variable, the brake actuation signal corresponding to a predetermined desired readiness for braking condition of the service brake,
the service brake includes a plurality of service brake units at a plurality of vehicle wheels,
the altering of a subsequent service brake application includes
placing the service brake into the predetermined desired readiness for braking condition by adjusting the actuators of the plurality of service brake units to decrease brake pad wear differences between the plurality of service brake units.

11. A method for monitoring a condition of a service brake for a vehicle having at least one linear path detection apparatus, comprising the acts of:
reading a position signal using the at least one linear path detection apparatus in a current braking event, the position signal representing a position of a component of the service brake detected by the linear path detection apparatus over time or a time profile;
reading at least one of a pressure signal, a control signal and a brake lining wear signal during the act of reading the position signal;
determining by evaluation by a controller at least one condition parameter of the service brake based on at least one of the read pressure signal, the control signal, and the brake lining wear signal; and
altering a subsequent service brake application based on the at least one of the at least one condition parameter and a controlled variable determined based on the at least one condition parameter,
wherein
the evaluation act includes:
determining during a brake release portion of the current braking event a time at which a brake clearance stroke is complete based on the at least one condition parameter,
determining from the position signal at the time the brake clearance stroke is complete an actual position of the component, and
determining a brake clearance as a difference between the actual position of the component when the brake clearance stroke is complete and an initial position of the component at a beginning of the current braking event, and
the altering act includes adjusting the brake clearance to a predetermined brake clearance based on the determined brake clearance.

* * * * *